(12) United States Patent
Kaniuk et al.

(10) Patent No.: US 6,810,819 B2
(45) Date of Patent: Nov. 2, 2004

(54) WASTE SORTING TABLE

(76) Inventors: Julie Kaniuk, RR#3, Waterford, ON (CA), N0E 1Y0; Eveline Kaniuk, c/o RR#3, Waterford, ON (CA), N0E 1Y0

( * ) Notice: Subject to any disclaimer, the term of this patent is extended or adjusted under 35 U.S.C. 154(b) by 42 days.

(21) Appl. No.: 10/327,475

(22) Filed: Dec. 24, 2002

(65) Prior Publication Data

US 2003/0131765 A1 Jul. 17, 2003

Related U.S. Application Data

(60) Provisional application No. 60/348,365, filed on Jan. 16, 2002.

(51) Int. Cl.$^7$ .............................................. A47B 85/00
(52) U.S. Cl. ...................................................... 108/25
(58) Field of Search ....................... 108/25, 26, 50.18, 108/50.11, 26.2, 153.1, 157.1, 157.14, 157.16, 158.12, 157.17; 220/23.9, 23.4, 910; 211/71.01

(56) References Cited

U.S. PATENT DOCUMENTS

| | | | | |
|---|---|---|---|---|
| 860,019 A | * | 7/1907 | Davis ........................... | 108/25 |
| 1,879,087 A | * | 9/1932 | Chomik ................. | 108/157.16 |
| 3,828,695 A | * | 8/1974 | Skarky ........................ | 108/26 |
| 4,437,714 A | * | 3/1984 | Struck .......................... | 108/25 |
| 4,450,761 A | * | 5/1984 | Bailey .......................... | 108/25 |
| 4,747,352 A | * | 5/1988 | Guidry et al. ................ | 108/26 |
| 5,098,174 A | * | 3/1992 | Worthley ..................... | 108/26 |
| 5,542,359 A | * | 8/1996 | Polries ........................ | 108/26 |
| 5,582,471 A | * | 12/1996 | Lin ............................. | 108/25 |
| 5,592,884 A | * | 1/1997 | Glick et al. .................. | 108/25 |
| 6,205,936 B1 | * | 3/2001 | Nelson et al. ........... | 108/157.1 |
| 6,321,662 B1 | * | 11/2001 | Fraise .......................... | 108/25 |
| 6,394,006 B2 | * | 5/2002 | Hoekstra et al. ............. | 108/26 |
| 6,578,497 B2 | * | 6/2003 | Reddig ........................ | 108/26 |
| 6,591,831 B2 | * | 7/2003 | Reynolds .................... | 108/26 |

FOREIGN PATENT DOCUMENTS

JP          4-319307      * 11/1992

* cited by examiner

*Primary Examiner*—Jose V. Chen

(57) ABSTRACT

A waste sorting table has a frame which includes receiving tubes for receiving waste therein and for sorting waste into distinct groupings within the frame. The table also includes a table top mounted onto the frame including waste receptacles defined in the table top for receiving waste there through and plastic garbage bags dimensioned to line the interior of the receiving tubes for holding the waste together and facilitating removal from the frame. The table also includes legs attached to the frame for supporting the frame.

12 Claims, 15 Drawing Sheets

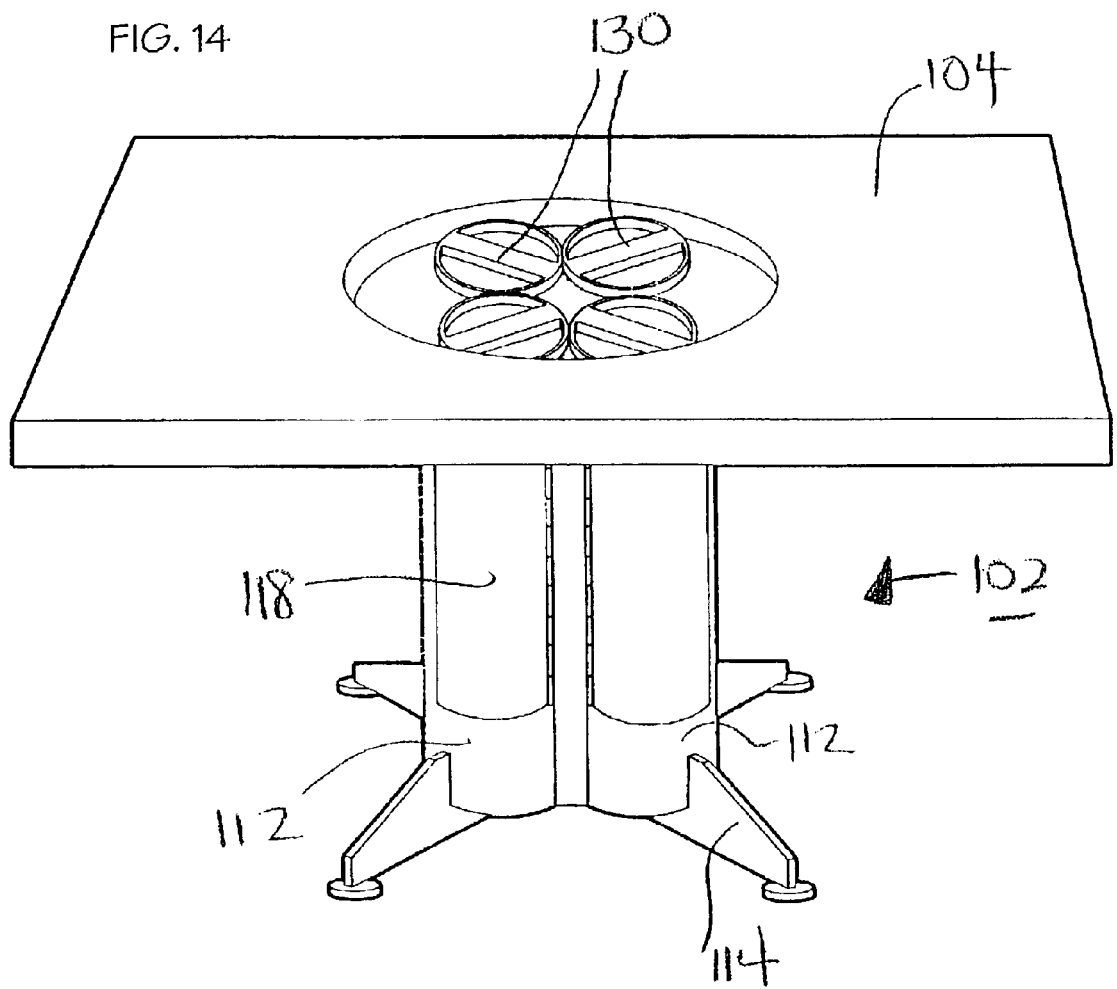

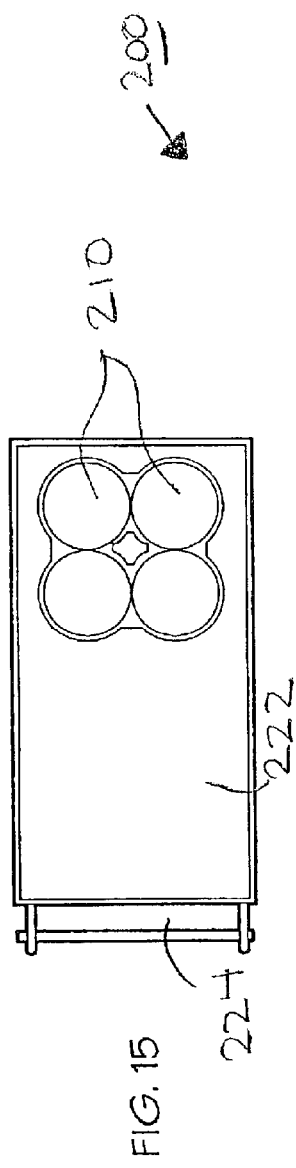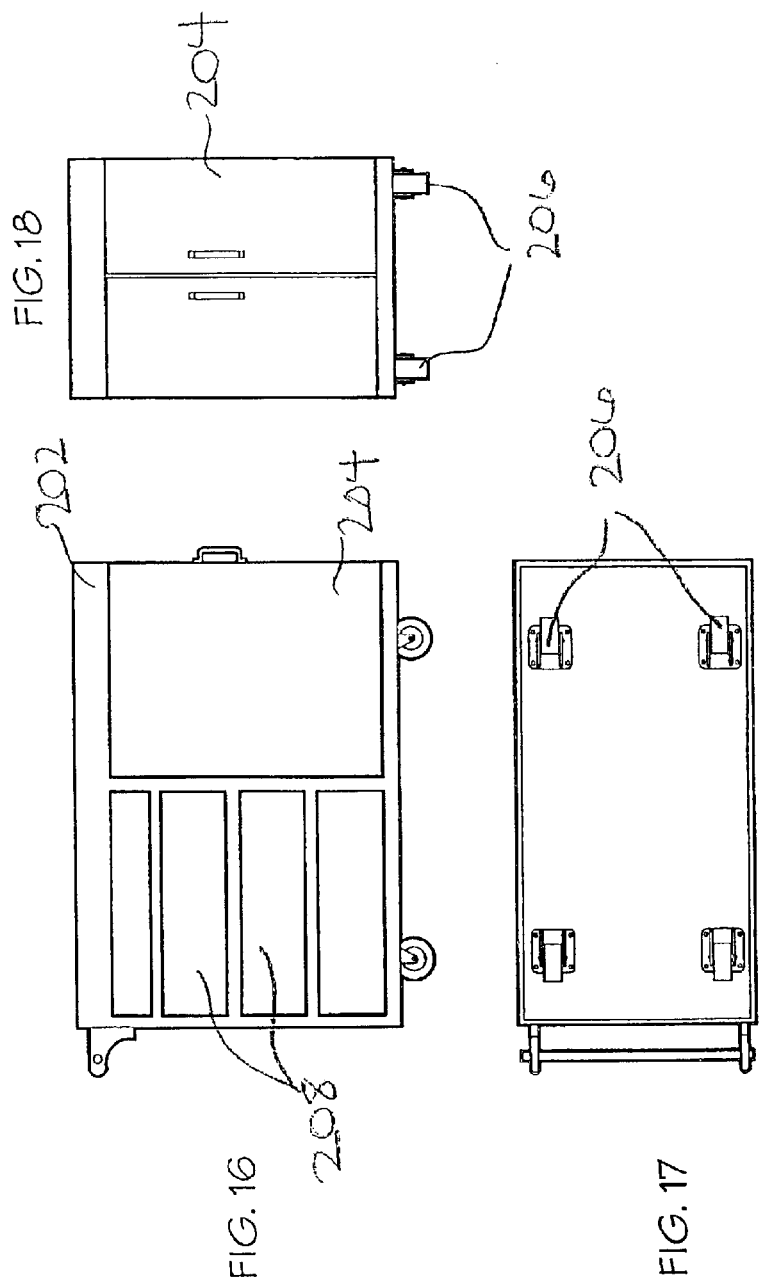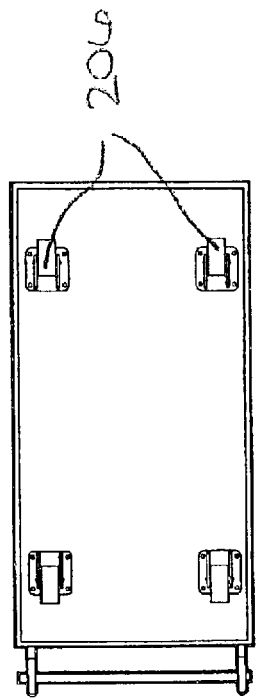

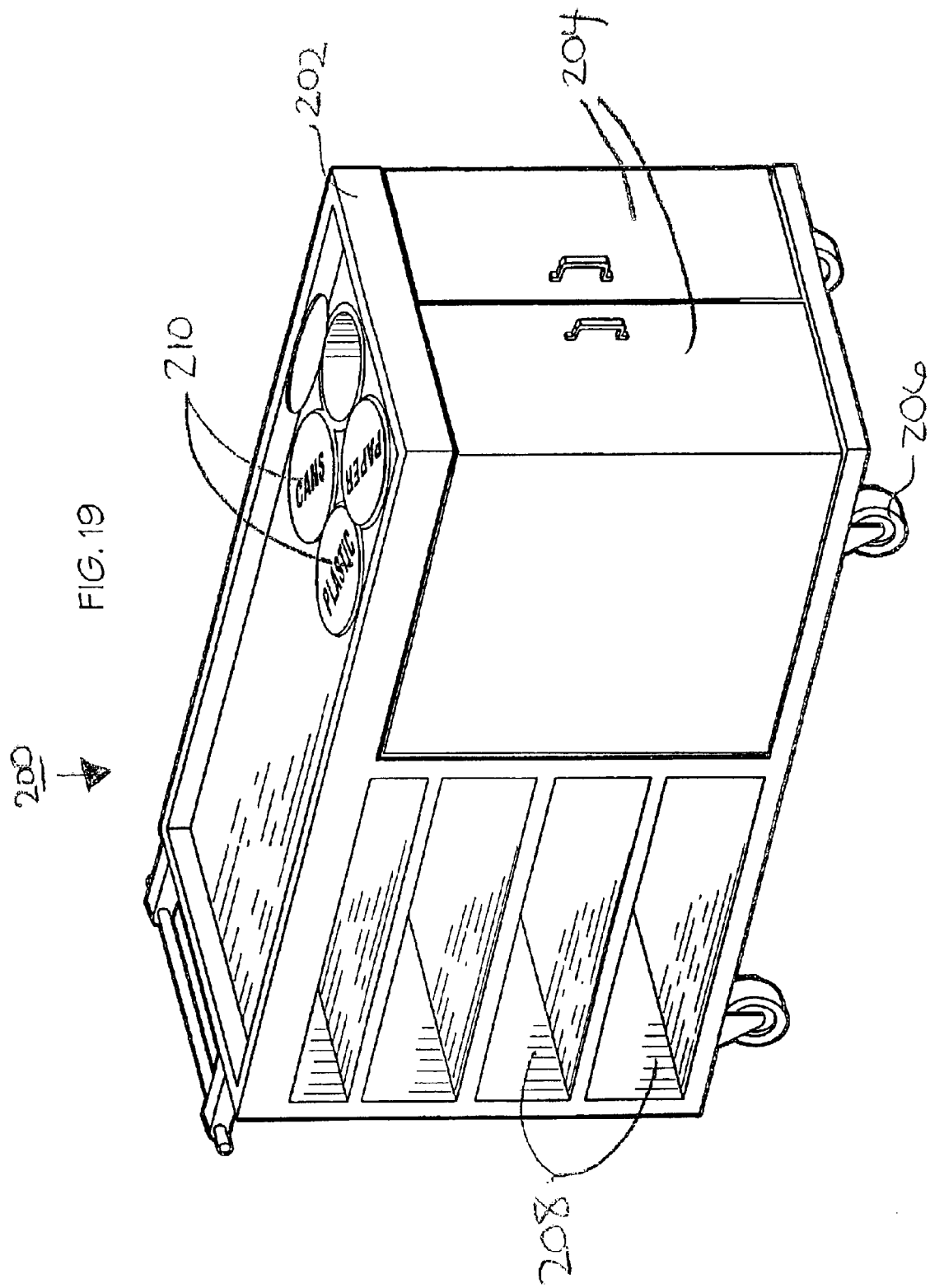

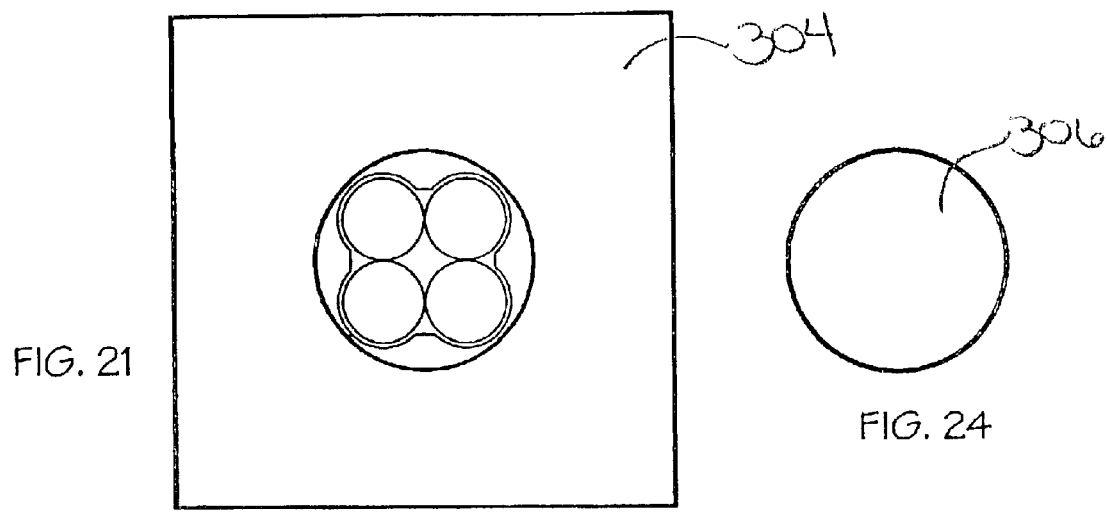
FIG. 21
FIG. 24
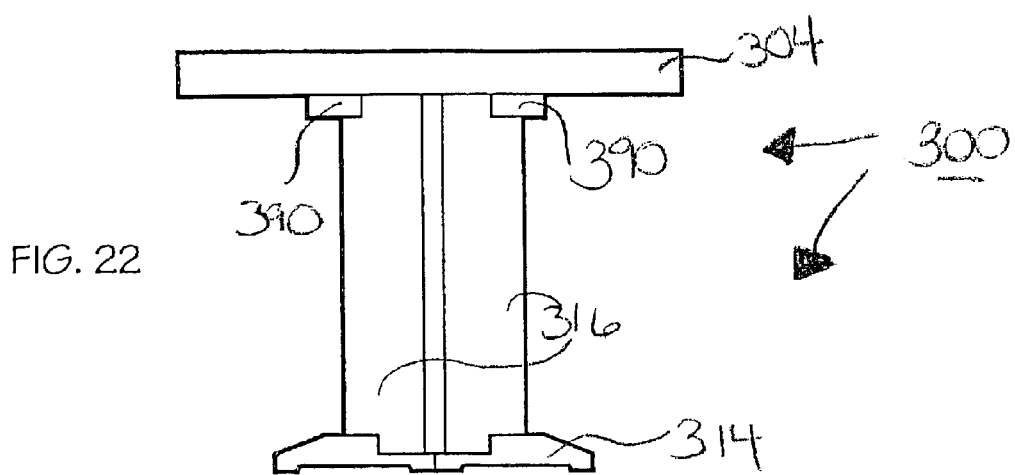
FIG. 22
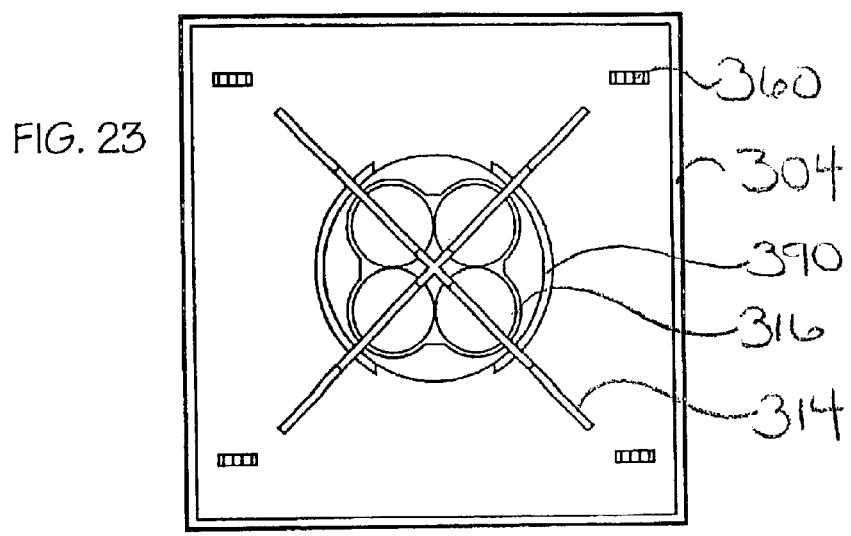
FIG. 23

WASTE SORTING TABLE

This application claims benefit to 60/348,365 Jan. 16, 2002.

FIELD OF THE INVENTION

The present invention relates to garbage disposal assemblies and more particularly pertains to a table mounted trash sorting system having multiple uses including but not limiting to restaurants, lounges and/or cafeterias.

BACKGROUND OF THE INVENTION

The use of trash disposal assemblies are known in the prior art generally speaking are comprised of containers having lids and/or other structural features for use separate and apart from a dining table. In many fast food outlets, currently large amounts of trash and garbage are generated because of the disposable plates, napkins, cutlery, packaging materials and other paper and plastic products that are used for packaging and presenting food stuff. Typically in these restaurants, garbage containers are located in multiple locations through out the restaurant for the disposal of garbage, either by staff working at the facility and/or by the customers themselves. The problem encountered with this type of trash removal is that presently recycling programs are in effect in many parts of the country and normally glass, metal containers, plastic products and paper products are separated into separate categories in order to facilitate recycling of these materials. Currently in fast food outlets, recycling is not encouraged because of the method of trash disposal.

The present invention is a table incorporating multiple trash disposal containers which are engineered directly in the table for immediate use by the customers when the trash is generated.

A number of prior art devices have been patented, however none address the issue of recycling and the sorting of materials into various categories.

Some of the prior art patents are for example, U.S. Pat. No. 6,152,047 by Macnamar issued Nov. 28, 2000, another example would be U.S. Pat. No. 5,542,359 by Polires issued Aug. 6, 1996. Other examples are U.S. Pat. No. 4,437,714 by Struck issued Mar. 20, 1984 and U.S. Pat. No. 3,364,882 by Merrick issued Jan. 23, 1968.

None of these tables run themselves for a practical use within high volume fast food type restaurants where a large amount of trash of various types are generated.

Therefore, there is a need for a table which can quickly and efficiently remove trash from a table and at the same time sort it into various categories for facilitating of recycling.

SUMMARY OF THE INVENTION

The present invention a waste sorting table comprises:
a) a frame including a means for storing and sorting waste into distinct groupings within said frame;
b) a table top mounted onto said frame including waste receptacles defined in said table top for receiving waste there through;
c) waste enclosing means for holding said waste together and facilitating removal from said frame; and
d) legs attached to said frame for supporting said frame.

Preferably wherein said storing means including receiving tubes for receiving waste therein.

Preferably wherein said frame including hollow support columns the interior of the support columns defining said receiving tubes, said columns for supporting said table top and receiving waste therein.

Preferably wherein said support columns include access doors for removal of said waste from said receiving tubes.

Preferably wherein said enclosing means includes plastic garbage bags dimensioned to line the interior of said receiving tubes.

In an alternate embodiment the present invention a collapsible waste sorting table comprises:
a) a frame including a means for storing and sorting waste into distinct groupings within said frame;
b) a table top detachably mounted onto said frame including waste receptacles defined in said table top for receiving waste there through;
c) waste enclosing means for holding said waste together and facilitating removal from said frame.
d) legs detachably mounted to said frame for supporting said frame.

In an alternate embodiment the present invention a moveable waste sorting table comprises:
a) a frame including a means for storing and sorting waste into distinct groupings within said frame;
b) a top mounted onto said frame including waste receptacles defined in said table top for receiving waste there through;
c) waste enclosing means for holding said waste together and facilitating removal from said frame.
d) wheels mounted to said frame for rollably supporting said frame.

BRIEF DESCRIPTION OF THE DRAWINGS

The invention will now be described by way of example only with reference to the following drawings in which:

FIG. 14 is a top front perspective view of the embodiment shown in FIG. 11.

FIG. 15 is a top plan view of the waste sorting buggy.

FIG. 16 is a side elevational view of the waste sorting buggy.

FIG. 17 is a bottom plan view of the waste sorting buggy.

FIG. 18 is a side elevational view of the waste sorting buggy.

FIG. 19 is a front perspective schematic view of the waste sorting buggy.

FIG. 21 is a top plan view of the collapsible waste sorting table.

FIG. 22 is a side elevational view of the collapsible waste sorting table.

FIG. 23 is a bottom plan view of the collapsible waste sorting table.

FIG. 24 shows the cover of the collapsible waste sorting table.

DETAILED DESCRIPTION OF THE PREFERRED EMBODIMENT

Figure 1:
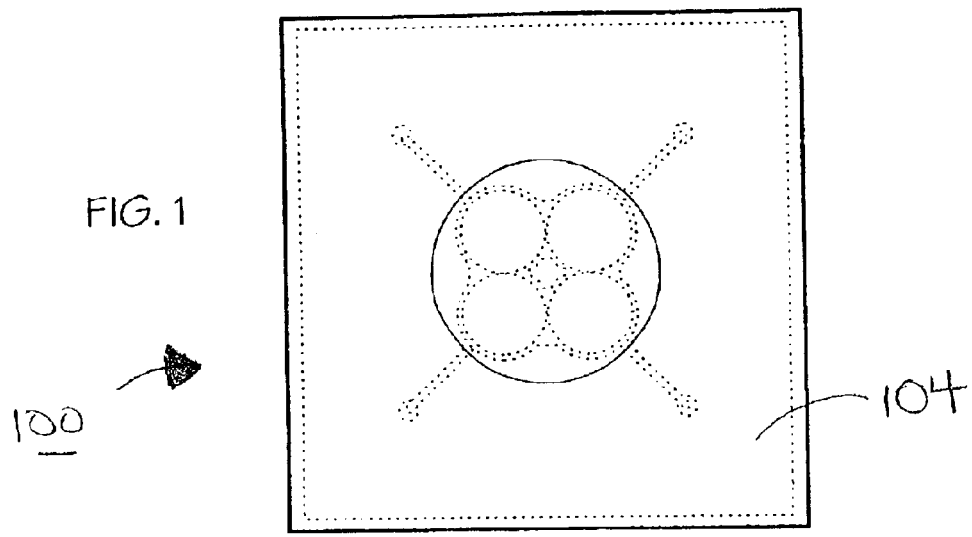
FIG. 1 is a top plan view of the present invention a waste sorting table.
Figure 2:
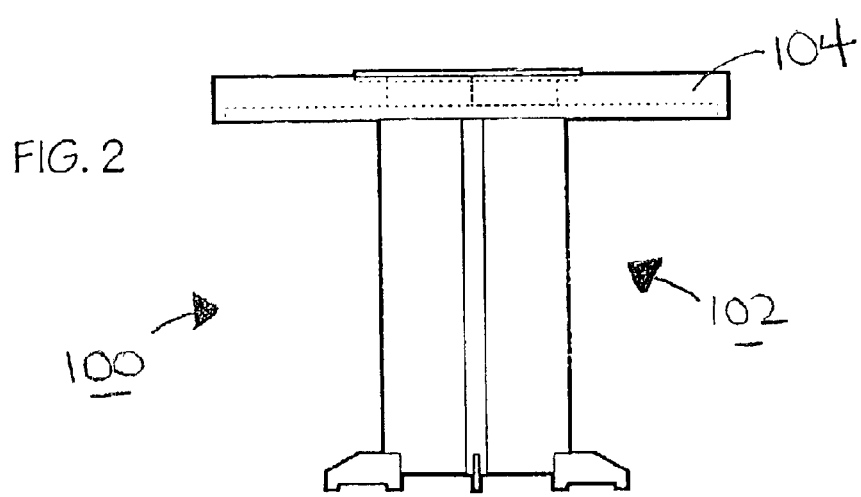
FIG. 2 is a side elevational view of the present invention a waste sorting table.
Figure 3:
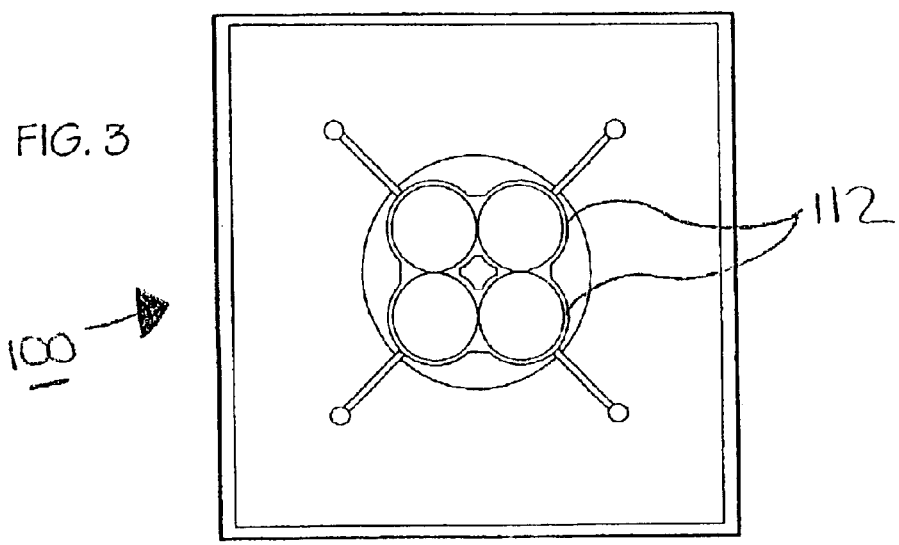
FIG. 3 is a bottom plan view of the present invention a waste sorting table.
Figures 4, 5:
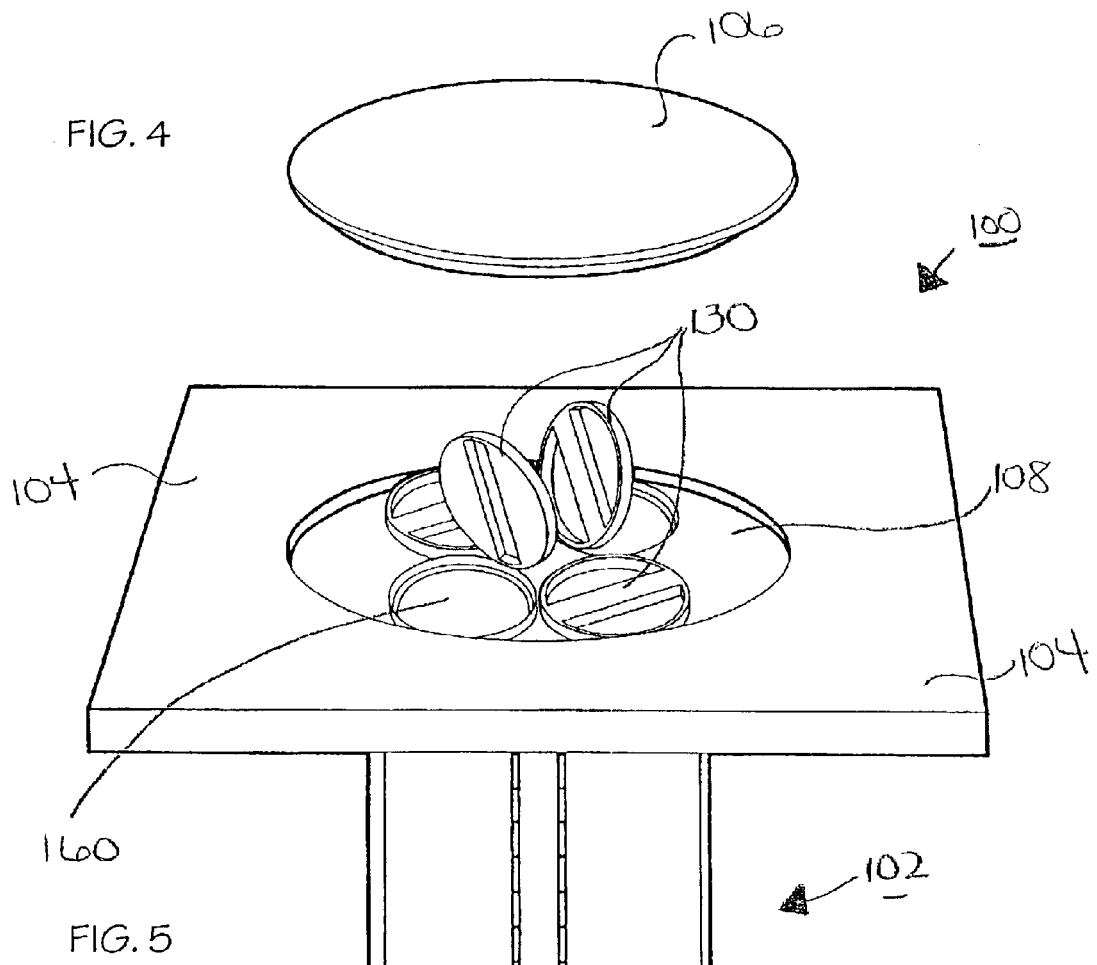
FIG. 4 is a top front perspective view of a cover used with the waste sorting table.
FIG. 5 is a front top perspective view of the waste sorting table.
Figure 6:
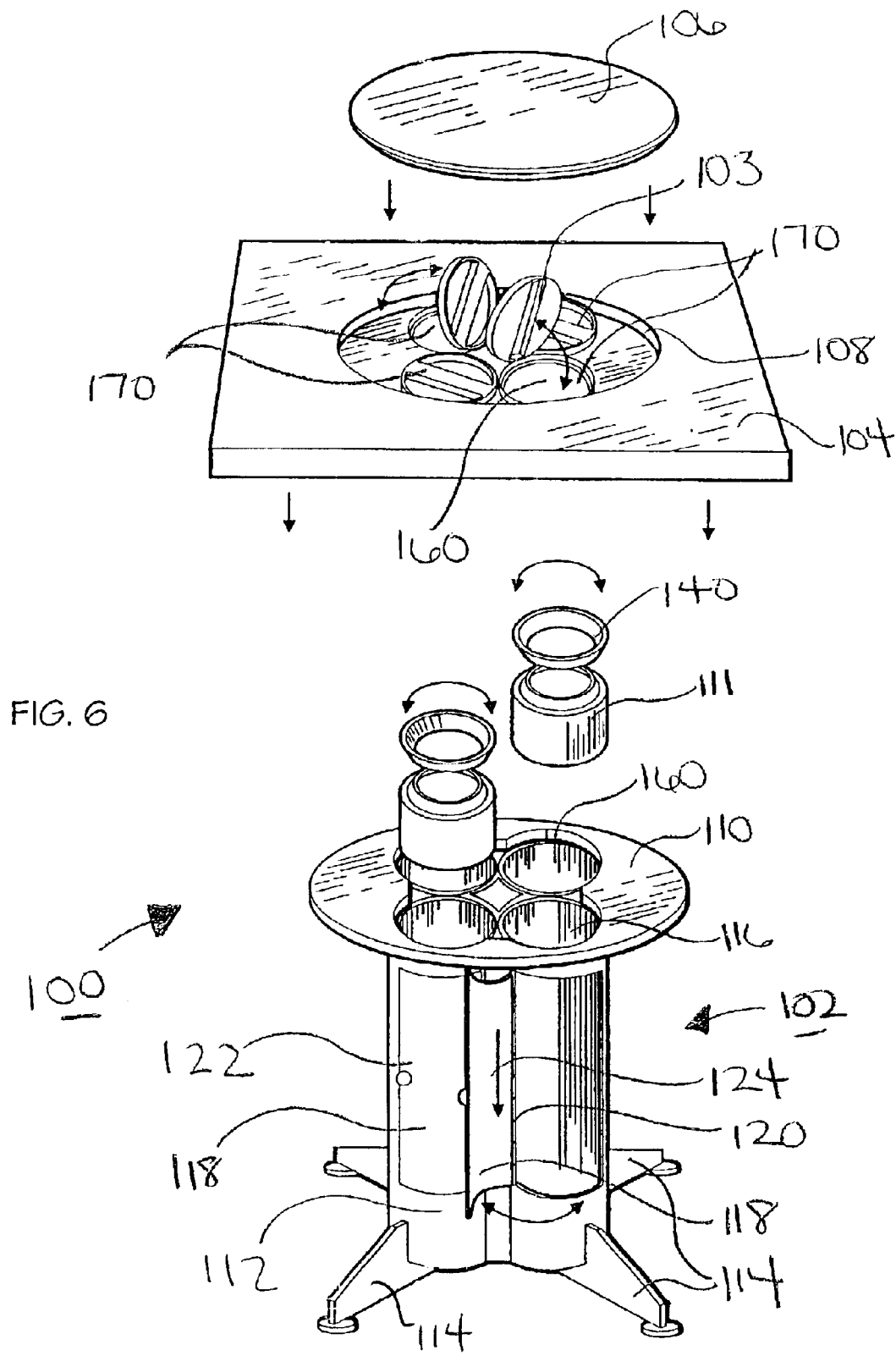
FIG. 6 is a partially exploded schematic perspective front view of the present invention, a waste sorting table.
Figure 7:
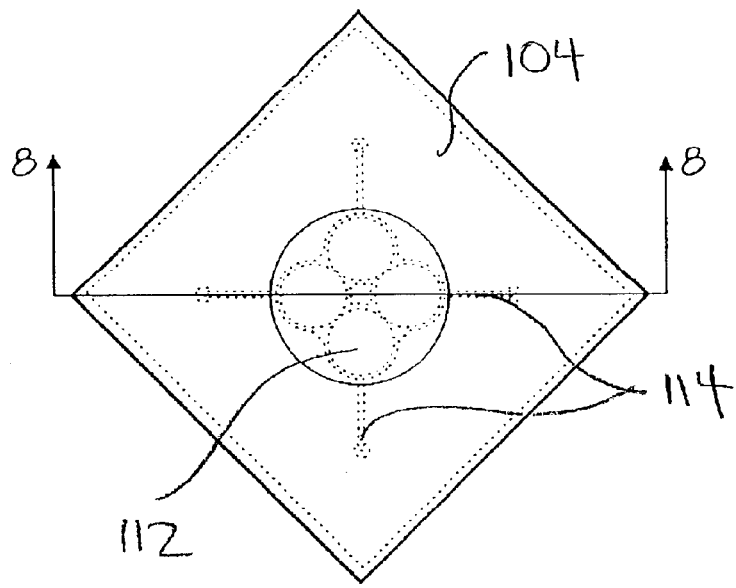
FIG. 7 is a top plan view of the present invention a waste sorting table.
Figure 8:
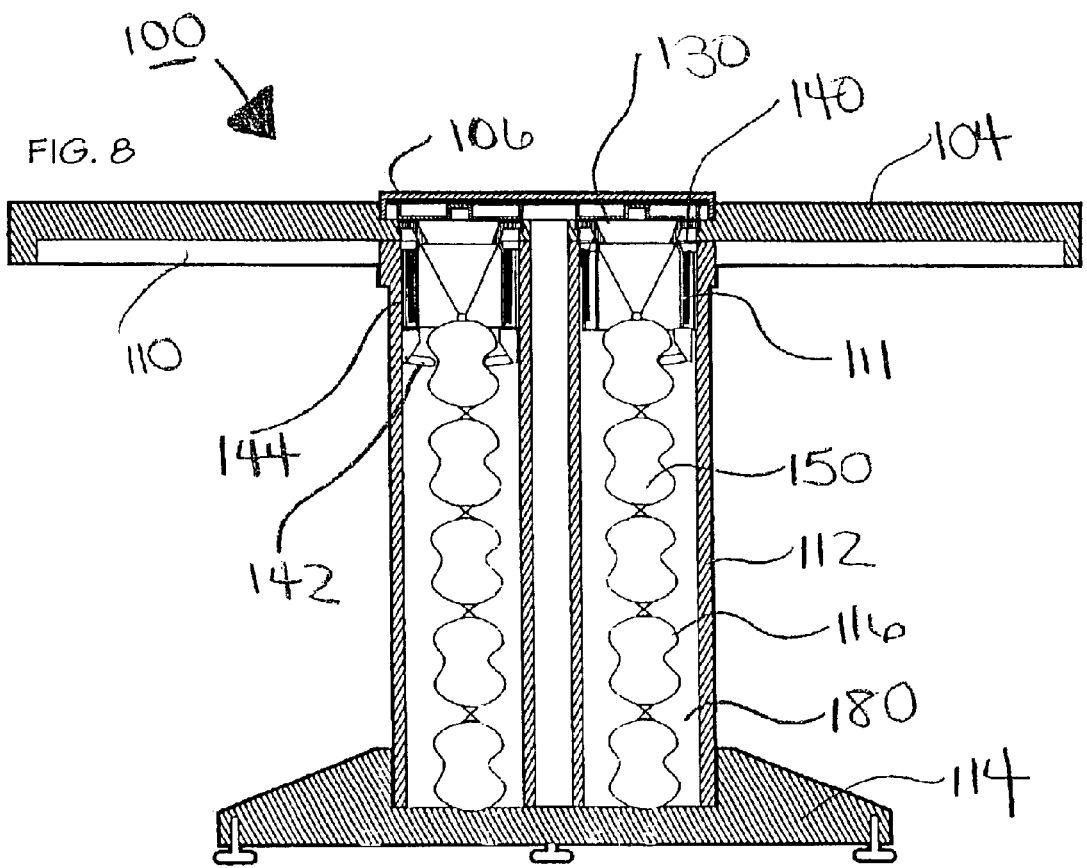
FIG. 8 is a side cross-sectional view taken along lines 8—8 in FIG. 7 of the waste sorting table.

The present invention a waste sorting table shown generally as 100 is best viewed in FIGS. 5, 6 and 8 includes the following major components, namely frame 102, having a table top 104 mounted thereon which also includes a cover 106 for covering up waste receptacle area 108.

Frame 102 includes the following major components, frame top 110, support columns 112 and legs 114.

Support columns 112 which are hollow define receiving tubes 116 which include access doors 118 having hinges 120 for moving access doors 118 between door closed position 122 and door open position 124.

The top of support columns 112 are adapted to receive therein a DIAPER GENIE® and are recessed into receiving tubes 116 as shown as best viewed in cross-section FIG. 8 and include receptacle covers 130 and in addition the entire waste receptacle area 108 can be covered using cover 106 to cover all of the receiving tubes and waste receptacle area 108 of table top 104.

The DIAPER GENIE® 111 manufactured by PLAYTEX™ includes a number of components including twist ring 140, clips 142 and a garbage bag reservoir 144 which function together to produce garbage bundles 150 which are sausage like packages or packets of garbage which are stored in the lower portions of receiving tubes 116 until they are emptied via access doors 118. The DIAPER GENIE® 111 in itself is a patented product marketed by PLAYTEX™ and is utilized to produce the waste sorting table 100 concept that we are describing in this specification. The details of the operation of the DIAPER GENIE® 111 can be found in the instruction manual which is included in each DIAPER GENIE® 111.

In use

The waste sorting table 100 as best shown in FIGS. 5, 6 and 8 includes a table top 104 having a waste receptacle area 108. In normal operation cover 106 is removed to expose receptacle covers 130 which are slightly recessed below the top portion of table top 104.

Receptacle covers 130 each are removable and expose a waste receptacle 170 there below from having a receptacle opening 160 for depositing garbage therein. Receptacle openings 160 communicate with interior of support columns 112 which are garbage receiving tubes 116 and serve to temporarily store garbage bundles 150.

A DIAPER GENIE® 111 is located proximate receptacle opening 160 near the top portion of each receiving tube 116 in order to receive garbage which is placed into each waste receptacle 170. As shown in the drawings four such waste receptacles 170 are present and therefore, four receptacle covers 130 are visible under cover 106 on table top 104.

Those who are familiar with operation of the DIAPER GENIE® 111 will understand that once a garbage bag has reached a certain capacity within the DIAPER GENIE® 111 the twist ring 140 is twisted to tie off that portion of the bag and a new portion of the bag is exposed and released from garbage bag reservoir 144, thereby sealing off the contents of the previous garbage placed within waste receptacle 170, thereby minimizing odours, smell and unsightliness of garbage which is stored within receiving tubes 116.

By having multiple waste receptacles 170 which are accessible from table top 104 of waste sorting table 100, one can designate each individual waste receptacle 170 to receive a specific type of garbage, thereby enabling immediate sorting of garbage directly at waste sorting table 100 into recyclable categories of garbage namely, plastic, paper, tin cans etc.

In this way those dining at waste sorting table 100 can immediately deposit and discharge their garbage while seated at the table by placing it into the designated waste receptacle 170 which is proximate the centre of table top 104.

The frame 102 is comprised of support columns 112 which are hollow and define receiving tubes 116 thereby defining waste receptacles 170 and a storage space below frame top 110. The storage space 180 which houses and stores garbage bundles 150 below the DIAPER GENIE® 111 can be accessed through access doors 118 which are hinged by hinges 120 to each support column 112. Moving access door 118 from the door closed position 122 to the door open position 124, one has access to the garbage bundles 150 located within each receiving tube 116 and can be suitably removed from the storage space 180 and disposed of in the proper recycling and/or garbage bin as required.

A person skilled in the art will immediately realize that there can be 1, 2, 3, and/or any number of waste receptacles 170 designed into waste sorting table 100, however by way of example, we have shown four waste receptacles 170 and waste sorting table 100 which is a good number for sorting of garbage into categories which are readily recyclable.

Those skilled in the art will also recognize that it is not absolutely necessary to use a DIAPER GENIE® 111 in waste receptacles 170 and one could also use a tubular or elongated garbage bags within receiving tubes 116 in such a manner that they can be closed off and easily removed from storage space 180 within each waste receptacle 170.

Waste sorting table 100 is very suitable for fast food type restaurants using a lot of paper and plastic cutlery which is usually disposed of at the end of each meal. It is also possible to use this table for finer dining by placing cover 106 there over, thereby covering over receptacle covers 130 and the waste receptacle 170.

Waste sorting table 100 therefore is a multi purpose table which can be used in a fast food environment and/or in the fine dining environment by simply adding or removing cover 106.

Figure 9:
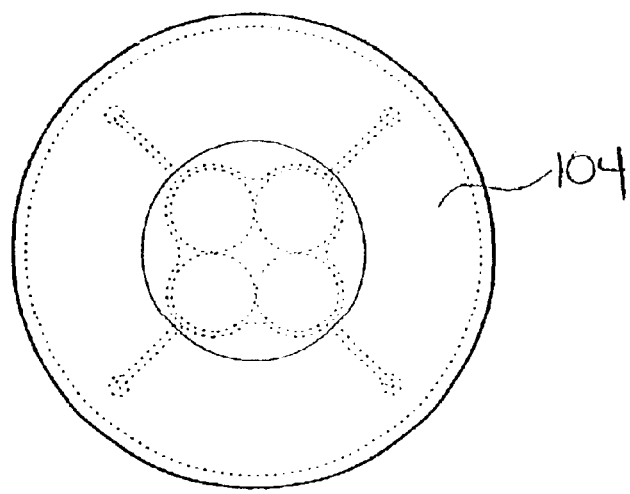
FIG. 9 is a top plan of an alternate embodiment of the present invention a was sorting table.
Figure 10:
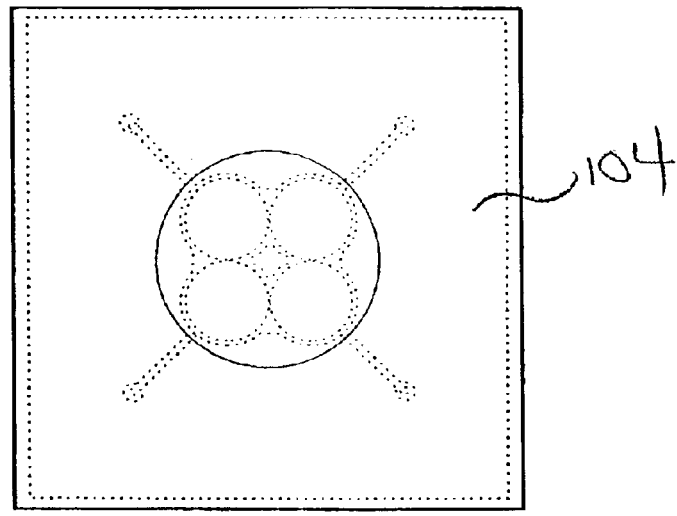
FIG. 10 is a top plan view of the present invention a waste sorting table.
Figure 11:
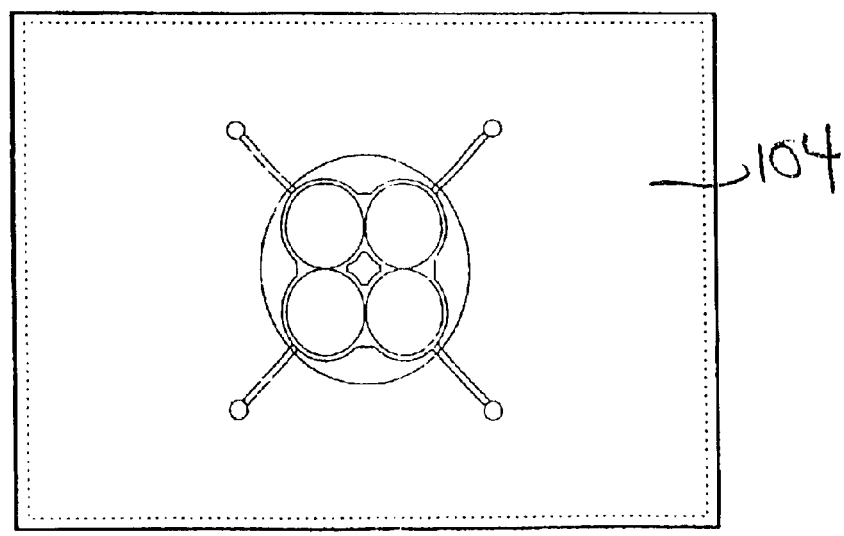
FIG. 11 is a top plan view of an alternate embodiment of the present invention a waste sorting table.
Figure 12:
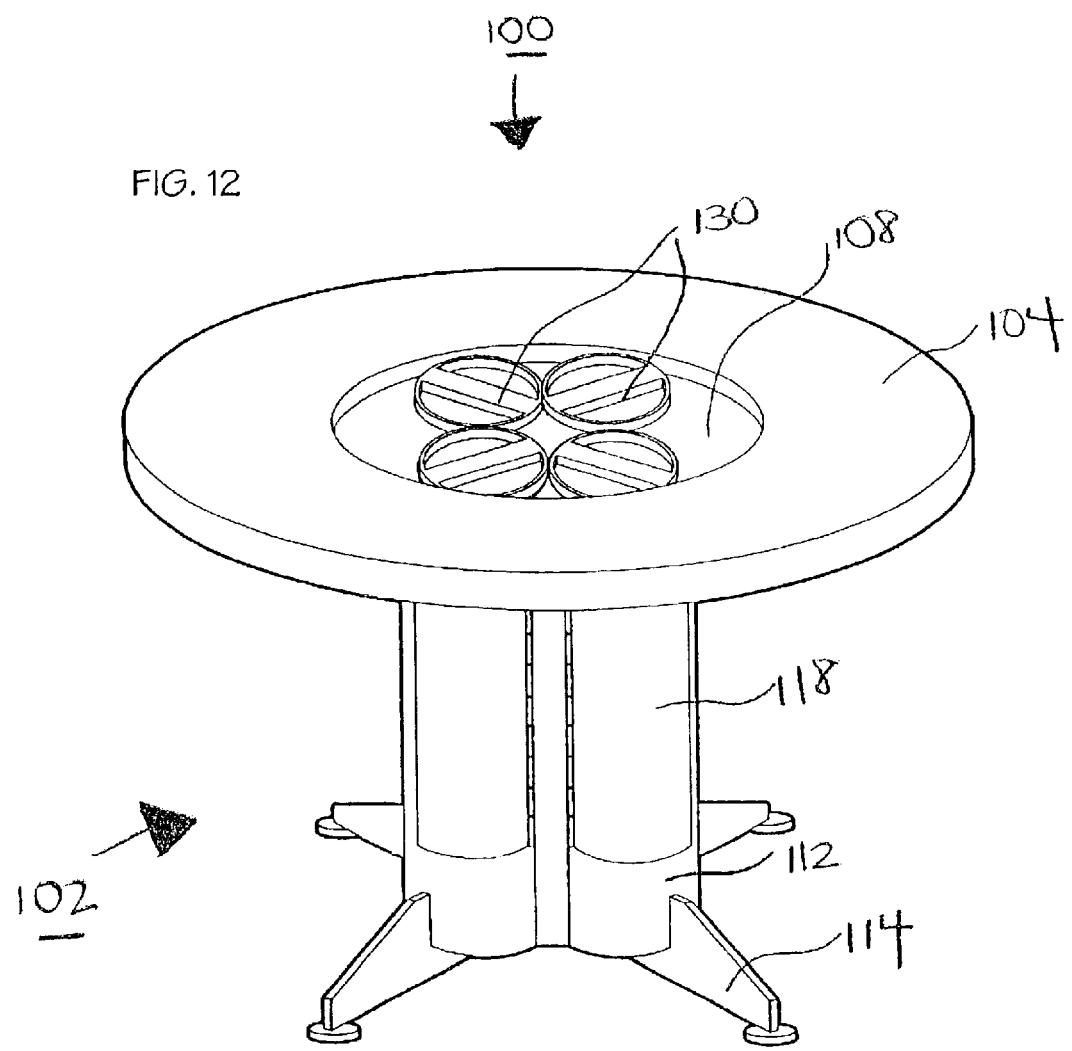
FIG. 12 is a top perspective view of the embodiment shown in FIG. 9.
Figure 13:
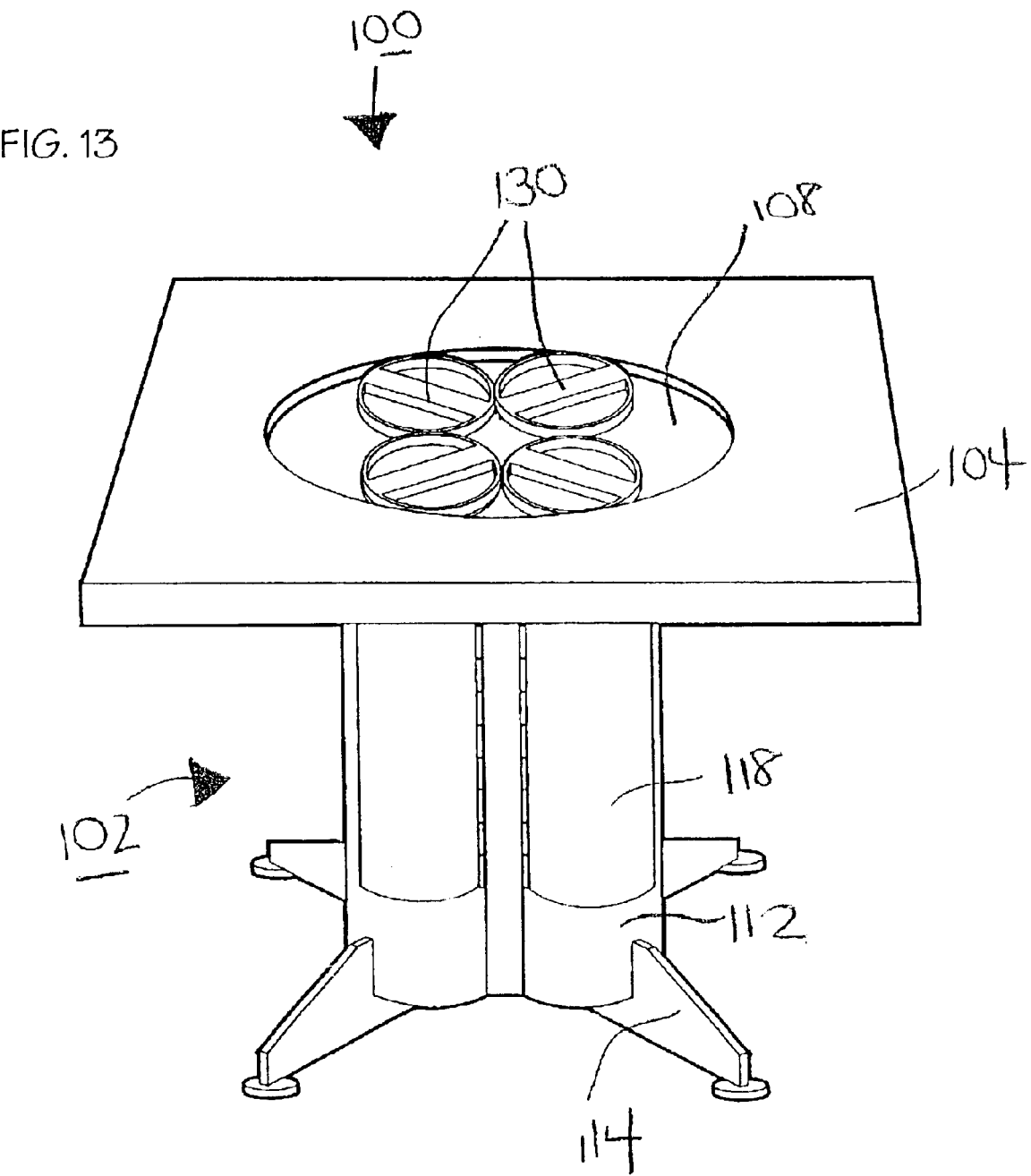
FIG. 13 is a top perspective view of the embodiment shown in FIG. 10.

FIGS. 9, 10 and 11 show that table top 104 can be circular as in FIG. 9 or square shaped as in FIG. 10 or rectangular as in FIG. 11 or any other shape which is practical for a table design.

This table can be constructed of any suitable materials including traditional materials such as wood, fibre board and plastic.

This same concept can also be applied to a removable or portable chart for disposing of garbage, for example, by room cleaning services within hotels. Waste sorting table 100 can also be designed to be a collapsible table so that it can be used in the outdoors and/or in other locations in which tables must erected and collapsed very quickly.

A Sorting Buggy

Figure 20:
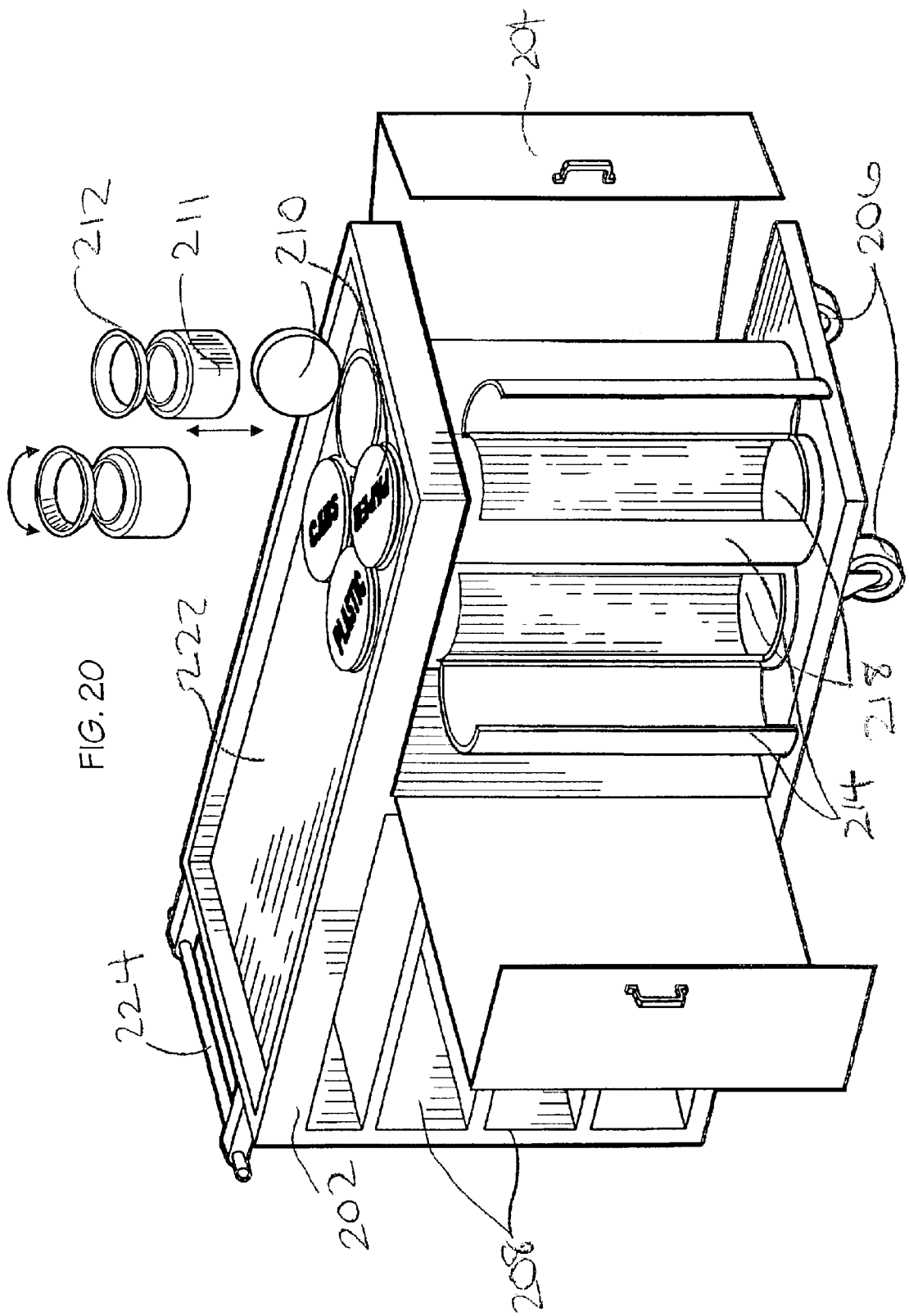
FIG. 20 is a front perspective exploded schematic view of the waste sorting buggy.
Figure 25:
FIG. 25 shows the cover of the collapsible waste sorting table.
Figure 26:
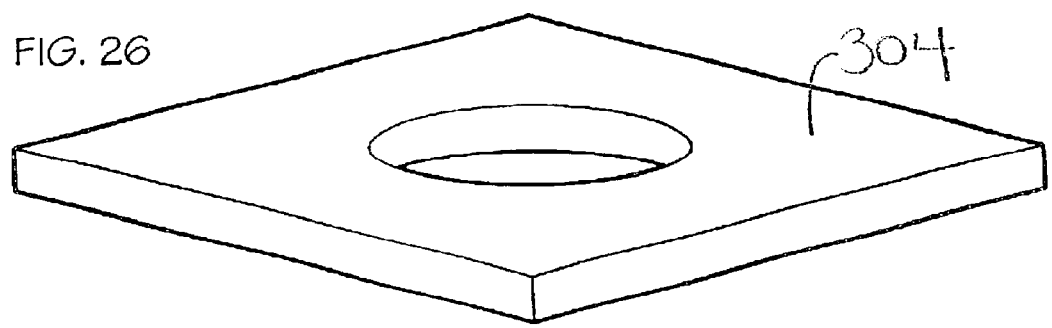
FIG. 26 shows the table top of the collapsible waste sorting table.
Figure 27:
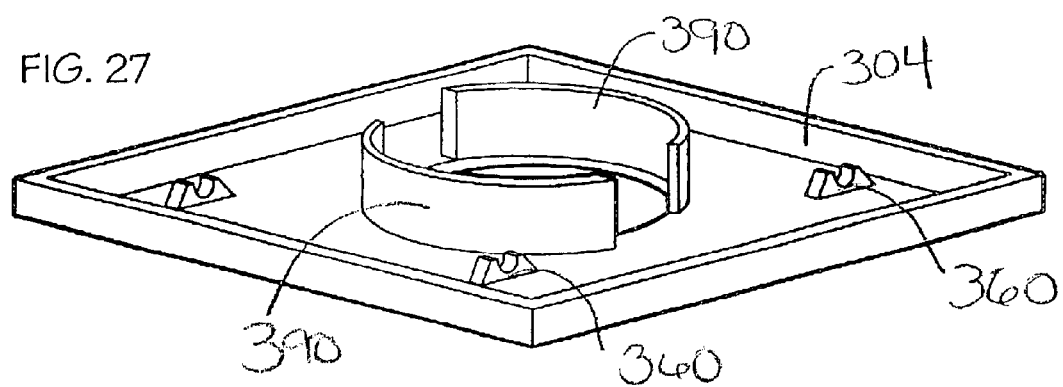
FIG. 27 shows the table top in the inverted position of the collapsible waste sorting table.
Figure 28:
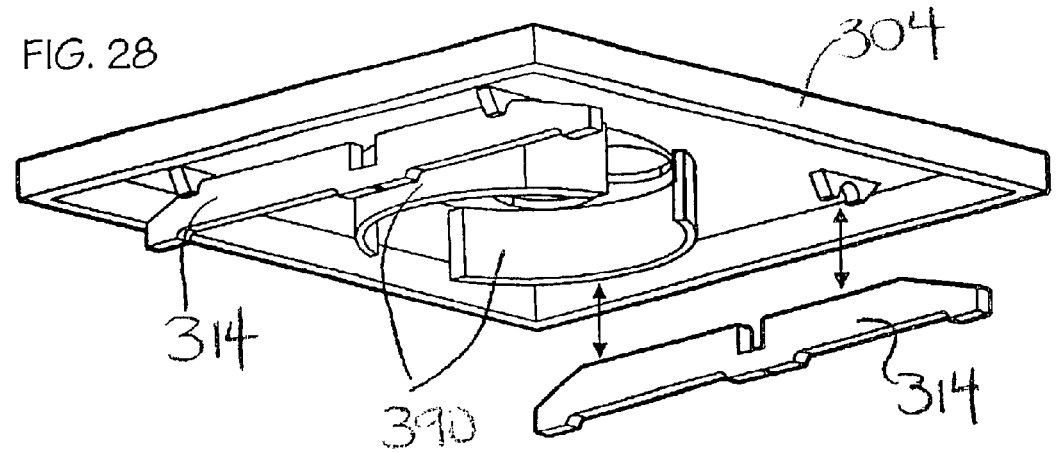
FIG. 28 is a bottom perspective schematic view showing the bottom of the table top of the collapsible waste sorting table, including the legs being clipped into position onto mounting clips.
Figure 29:
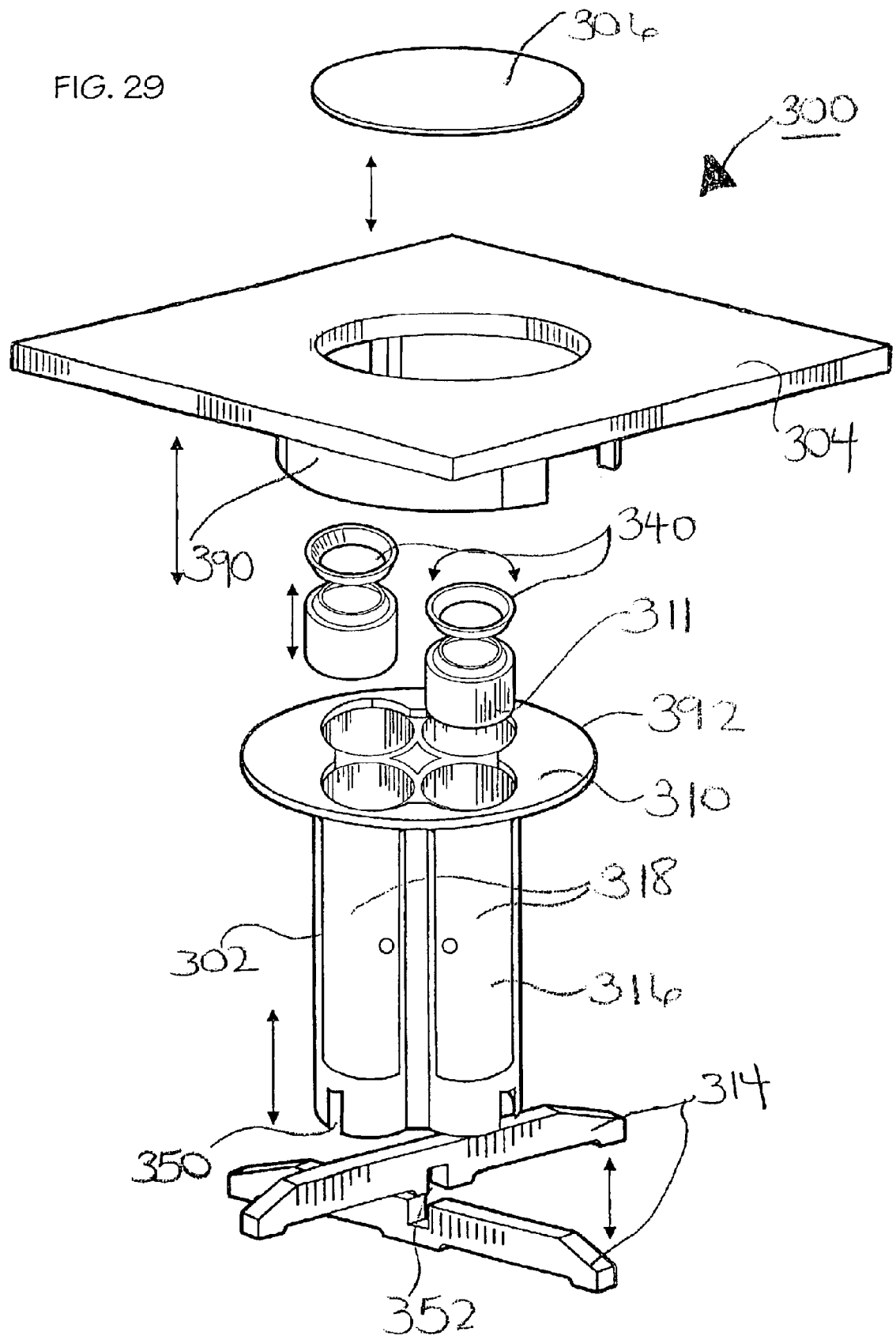
FIG. 29 is an exploded perspective schematic view of the collapsible waste sorting table.

Referring now to FIGS. 15 through 20 an alternate embodiment to the present invention is a waste sorting buggy shown generally as 200. As best seen in FIG. 20, waste sorting buggy 200 includes the following major components, namely frame 202, outer doors 204, wheels 206, shelves 208, receptacle covers 210, DIAPER GENIE® 211, twist rings 212, access doors 214, receiving tubes 218, top 222 and handle 224. The unit as shown in FIGS. 15 through 20 is a portable rollable waste sorting buggy 200 which can be used for cleaning staff in Hotels, Motels and the like and serves to provide for immediate sorting of waste as it is collected into discrete compartments. Frame 202 of waste sorting buggy 200 has preferably two doors 204 which conceal behind it four receiving tubes 218, each having a DIAPER GENIE® 211 mounted proximate the top of each receiving tube 218. Covering off each receiving tube 218 is a receptacle cover 210 which covers up the DIAPER GENIE® 211 when not in use.

In use

Waste sorting buggy 200 is used in analogous fashion as waste sorting table 100 with the major difference that waste sorting buggy 200 is portable and rollable from one location to another. For example, cleaning staff in a Hotel or Motel could use waste sorting buggy to collect refuse and garbage from rooms that have been rented out. As the garbage is collected, it is deposited into the appropriate receiving tube 218 and collected as previously described by the DIAPER GENIE® 211 system. In this manner the waste can be discreetly organized into recyclable categories, such as plastic, paper, metal cans etc., so that immediately the garbage is sorting into the appropriate category.

Once each receiving tube 218 is full, outer doors 204 are hingably open to reveal there behind receiving tubes 218 each having access doors 214 for removal of the refuse in accordance with the DIAPER GENIE® system. In this manner the refuse is hygienically concealed and automatically categorized for simple and easy recycling.

Collapsible Waste Sorting Table

An alternate embodiment to the present invention is shown in FIGS. 21 through 30 inclusive and depicts a collapsible waste sorting table 300 which in many aspect is similar to waste sorting table 100 with the additional feature that the table is designed to be easily collapsible.

Collapsible waste sorting table 300 includes the following major components, a frame 302, table top 304, cover 306, legs 314, receiving tubes 316, access doors 318.

Figure 30:
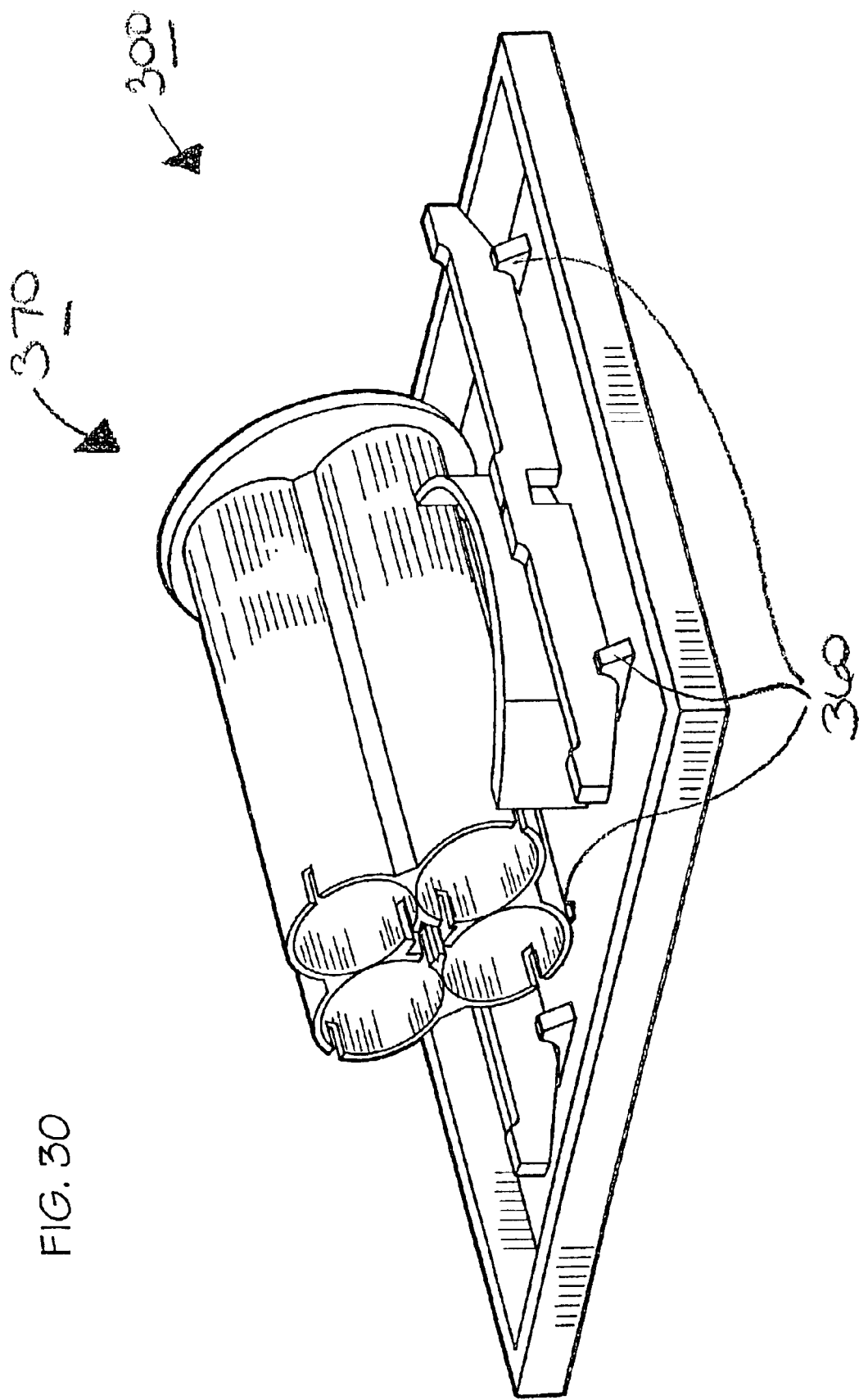
FIG. 30 is a schematic view of the waste sorting table in the collapsed position.

Collapsible waste sorting table 300 is designed such that the major components of the table can be easily taken apart and collapse into collapse position 370 as shown in FIG. 30. In order to allow collapsing of the table, table top 304 is fitted with female mounting sleeves 390 which mate together with male receiving disc 392 which is the outer edge of frame top 310. In addition, legs 314 include rabbet grooves 352 which allow legs 314 to interlock with each other in an X configuration. The bottom of each receiving tube 314 also includes a rabbet groove 350 which cooperatively mounts onto each leg 314 as shown in the assembled condition, FIG. 22.

In use

In all respects the use of collapsible waste sorting table 300 is analogous and identical to waste sorting table 100 with the additional features that collapsible was sorting table 300 is designed so that it can collapse into collapsed position 370.

In order to assemble the table, the rabbet grooves 350 of each leg 314 are snapped together to form an X type configuration. Thereafter the rabbet grooves 350 of receiving tubes 360 are dimensioned to interactively snap onto legs 314. Thereafter table to 304 having female mounting sleeves 390 are frictionally and interfering fit onto frame top 310 making connection with male receiving disc 392. In order to collapse the table, the reverse procedure is implemented.

In order to achieve a collapse position 370 as shown in FIG. 30, mounting clips 360 are added onto the bottom of table top 304 to releasable receive legs 314 and frame 302 of collapsible waste sorting 300.

In the other aspects of how the waste and/or refuse is deposited into the receiving tubes 316, the description given above for waste sorting table 100 applies and this table is used in the identical fashion.

It should be apparent to persons skilled in the arts that various modifications and adaptation of this structure described above are possible without departure from the spirit of the invention the scope of which defined in the appended claim.

We claim:

1. A waste sorting table comprising:
   a) a frame including a means for storing and sorting waste into distinct groupings within said frame;
   b) a table top mounted onto said frame including waste receptacles defined in said table top for receiving waste there through;
   c) waste enclosing means for holding said waste together and facilitating removal from said frame; and
   d) legs attached to said frame the supporting said frame;
   e) wherein said storing means including receiving tubes for receiving waste therein; and
   f) wherein said frame including hollow support columns, the interior of the support columns defining said receiving tubes, said columns for supporting said table top and receiving waste therein.

2. The waste sorting table claimed in claim 1 wherein said support columns include access doors for removal of said waste from said receiving tubes.

3. The waste sorting table claimed in claim 1 wherein said enclosing means includes plastic garbage bags dimensioned to line the interior of said receiving tubes.

4. A collapsible waste sorting table comprising:
   a) a frame including a means for storing and sorting waste into distinct groupings within said frame;
   b) a table top detachably mounted onto said frame including waste receptacles defined in said table top for receiving waste there through;
   c) waste enclosing means for holding said waste together and facilitating removal of waste from said frame
   d) legs detachably mounted to said frame for supporting said frame
   e) wherein said storing means including receiving tubes for receiving waste therein; and
   f) wherein said frame including hollow support columns, the interior of the support columns defining said receiving tubes, said columns for supporting said table top and receiving waste therein.

5. The waste sorting table claimed in claim 4 wherein said support columns include access doors for removal of said waste from said receiving tubes.

6. The waste sorting table claimed in claim 4, wherein said waste enclosing means includes plastic garbage bags dimensioned to line the interior of said receiving tubes.

7. The waste sorting table claimed in claim 4 wherein said table top including mounting clips for releasably attaching said frame and said legs to said table top thereby placing said waste sorting table into a collapsed position.

8. The waste sorting table claimed in claim 4 wherein said legs are constructed in two longitudinal pieces arranged in a X configuration and held together centrally with rabbet grooves defined in each leg.

9. The waste sorting table claimed in claim 4 wherein said table top including a removeable cover for covering over said waste receptacles when dining at said table.

10. A moveable waste sorting table comprising:
   a) a frame including a means for storing and sorting waste into distinct groupings within said frame;
   b) a table top mounted onto said frame including waste receptacles defined in said table top for receiving waste there through;
   c) waste enclosing means for holding said waste together and facilitating removal from said frame
   d) wheels mounted to said frame for rollably supporting said frame;
   e) wherein said storing means including receiving tubes for receiving waste therein; and
   f) wherein said frame including hollow support columns, the interior of the support columns defining said receiving tubes, said columns for supporting said table top and receiving waste therein.

11. The waste sorting table claimed in claim 10 wherein said support columns include access doors for rein oval of said waste from said receiving tubes.

12. The waste sorting table claimed in claim 11 wherein said enclosing means includes plastic garbage bags dimensioned to line the interior of said receiving tubes.

* * * * *